(12) United States Patent
Bendall et al.

(10) Patent No.: US 7,782,453 B2
(45) Date of Patent: Aug. 24, 2010

(54) METHOD FOR MEASURING MISSING CORNER DIMENSIONS

(75) Inventors: Clark A. Bendall, Syracuse, NY (US); Steven Crews, Newnan, GA (US)

(73) Assignee: GE Inspection Technologies, LP, Lewistown, PA (US)

( * ) Notice: Subject to any disclaimer, the term of this patent is extended or adjusted under 35 U.S.C. 154(b) by 769 days.

(21) Appl. No.: 11/617,340

(22) Filed: Dec. 28, 2006

(65) Prior Publication Data

US 2008/0158556 A1    Jul. 3, 2008

(51) Int. Cl.
*G01N 21/00*    (2006.01)
(52) U.S. Cl. .................................................. 356/241.1
(58) Field of Classification Search ........................ None
See application file for complete search history.

(56) References Cited

U.S. PATENT DOCUMENTS

| 5,633,675 | A | 5/1997 | Danna et al. |
| 6,945,931 | B2 | 9/2005 | Ogawa |
| 7,518,632 | B2 * | 4/2009 | Konomura ................... 348/65 |

* cited by examiner

*Primary Examiner*—Gregory J Toatley, Jr.
*Assistant Examiner*—Amanda H Merlino
(74) *Attorney, Agent, or Firm*—Global Patent Operations; Stephen G. Midgley

(57) ABSTRACT

A method for obtaining the area of a missing portion of an object under inspection with a borescope includes aligning the borescope with the object under inspection, extrapolating the missing edges of the missing portion and calculating the missing portion area using the extrapolated missing edges and a defined remaining edge of the missing portion.

12 Claims, 6 Drawing Sheets

METHOD FOR MEASURING MISSING CORNER DIMENSIONS

BACKGROUND OF THE INVENTION

The field of the invention relates to industrial borescopes and measurements taken therewith.

Borescopes are often used in industrial applications to inspect objects within machines or devices which are difficult or impractical to disassemble for inspection, such as aircraft engines or power generation turbines. U.S. Pat. No. 5,633,675 describes a borescope device having a mechanism for generating and projecting a shadow on an object of interest. The shadow has a known projection geometry relative to the field of view. The position of the shadow in captured images provides object distance and magnification information which enables the determination of the size of other visible elements on the object of interest being inspected with the borescope. Other measurement methods such as the stereoscope approach described in U.S. patent also allow such size determinations.

Referring now to FIG. 1 there is shown a borescope imager head 10 housed in a small diameter housing 14. The borescope imager head 10 has a fiber optic bundle 12 for conveying light from an illumination source outside the head, and a video image sensor 18 with associated optics 20 placed distally at least a given distance from the image sensor. The light from the tip 42 of the fiber optic bundle 12 passes through an optically transparent illumination window 32 into which is set, etched, drawn or otherwise affixed an opaque object 16 that can cast a shadow either on the target or in the plane of the target. As known in the art, the video image sensor 18 comprises a CCD imager 22, a hybrid circuit 26 connected thereto by well known means such as wires, and a cable 30 for relaying the video image detected through an optically transparent optic window 33 to a monitor or other device, typically via a video processing system. Video processing systems can include A/D converters, digital signal processing and D/A conversion to generate a signal suitable for analog monitors.

Borescope images can reveal that portions of an apparatus under inspection are damaged, such as by missing portions of the apparatus. Turbine blades, for example, do wear or can break, so that the end portions of the blades are sometimes broken off or worn from the original size and shape. It is advantageous when using a boresope to inspect an apparatus to also be able to determine the size of the missing or worn portion of the apparatus under inspection. The missing length of one or both original edges must often be known for compliance with standards for wear and damage. Current methods for determining missing dimensions do not address accurately determining the length of the missing original edges. Current methods typically assume that edges of a blade are perpendicular and in a single plane, which is not usually the case, so that measurement error is inherent when using current methods. It is also difficult to determine a missing area of a blade or other object corner, since two edges must be extrapolated and combined with the remaining missing portion edge to obtain the border of the missing area. Accurately determining the bounds of a missing portion is not readily done using current methods.

U.S. Pat. No. 6,945,931 describes several methods for calculating the missing area of a turbine blade using a borescope. The methods require determination of at least one plane relative to the blade, combined with a second plane or line, that is used to establish the boundary of the original, undamaged blade. Vectors are used with points on the blade to establish the plane perpendicular to the blade top edge. Complex calculations are required simply to establish the position of the borescope relative to the blade for taking a measurement. The '931 patent provides methods for determining area by dividing the boundaries of the missing area into smaller, geometric shape samples, for which samples area calculations are more easily made and then summed to produce a whole missing area value.

The above-referenced patent describes a complex method involving the user placement of numerous cursors to determine a missing corner area. Many maintenance specifications for turbine engines set limits on the length of material missing along the two edges that would intersect at the corner rather than the missing area. Thus, the referenced patent does not provide the information needed by inspectors, and it requires the placement of more cursors than are needed to determine the necessary missing length information thus reducing the efficiency of such measurements. Accordingly, a need exists for an improved measurement system which more quickly and efficiently provides a more accurate missing corner measurement, in particular, one which provides a measurement of the length and/or depth of the missing area bounds.

BRIEF DESCRIPTION OF THE INVENTION

According to an embodiment of the invention, a method of measuring missing corner dimensions of an object under inspection with a borescope is provided. Using a shadow-type probe, the shadow is aligned with the object under inspection to provide a frame of reference. The view magnification of the object under inspection via the probe is determined using the shadow. A cursor is used to mark at least two points on each of the side and top edges of the object under inspection to identify the boundaries. One point marked on each edge is where the missing area begins. The missing area is bounded by the intersection of the lines defined by the two marked edges. The dimensions of the missing edges bounded by the cursor markings and the line intersection are calculated and provided to a user.

Alternatively, an embodiment of the invention uses a probe, such as a stereoscopic probe to view the object under inspection having a missing portion and obtains the dimensions of the missing portion. The probe is aligned with the object under inspection to view a region of the object including the missing portion and then the cursor is used to mark the points on the remaining edges, and dimensions are obtained as in the prior embodiment.

In a further embodiment of the invention, an inspection probe is used to view an object having a missing portion with a boundary which does not lie entirely in one plane. The probe is aligned with the object under inspection to view the missing portion, and then the edges of the object under inspection are defined as described above using cursor marks. A reference plane is determined from the cursor marks, planes perpendicular to the reference plane defined by the cursor marks along each remaining edge are generated, and the intersection of the perpendicular planes and reference plane is identified. The missing edge dimensions are then measured using the cursor marks and intersection point.

In another embodiment of the invention, three cursor marks are made. Two cursor marks define one edge, while the third cursor mark is made at the point where the missing portion begins on the adjacent edge. A video processing unit superimposes a line extrapolated from the third cursor mark to be perpendicular with a line defined by the first two cursor marks. The extrapolated line is adjusted until it aligns with the adjacent edge and intersects the line defined by the first two cursor marks at the correct angle. Measurements of the missing area dimensions are then taken using the bounds defined by the adjusted extrapolated line and line defined by the first two cursor marks.

In a still further embodiment, only two cursor marks are utilized, one positioned at each remaining edge termination point on the missing portion. Lines are generated extending from each cursor point, preferably so that they intersect. The generated lines are then manually adjusted, such as by a borescope operator, until each aligns with the remaining edge of the side where the cursor marker origination point is positioned. The dimensions of the missing portion can then be obtained from the corrected intersection point of the generated lines and the cursor markers.

The various features of novelty which characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the many forms of the invention. The drawings are not intended as showing the limits of all of the ways the invention can be made and used. Changes to and substitutions of the various components of the invention can of course be made. The invention resides as well in sub-combinations and sub-systems of the elements described, and in methods of using them.

DETAILED DESCRIPTION OF THE INVENTION

Figure 1:
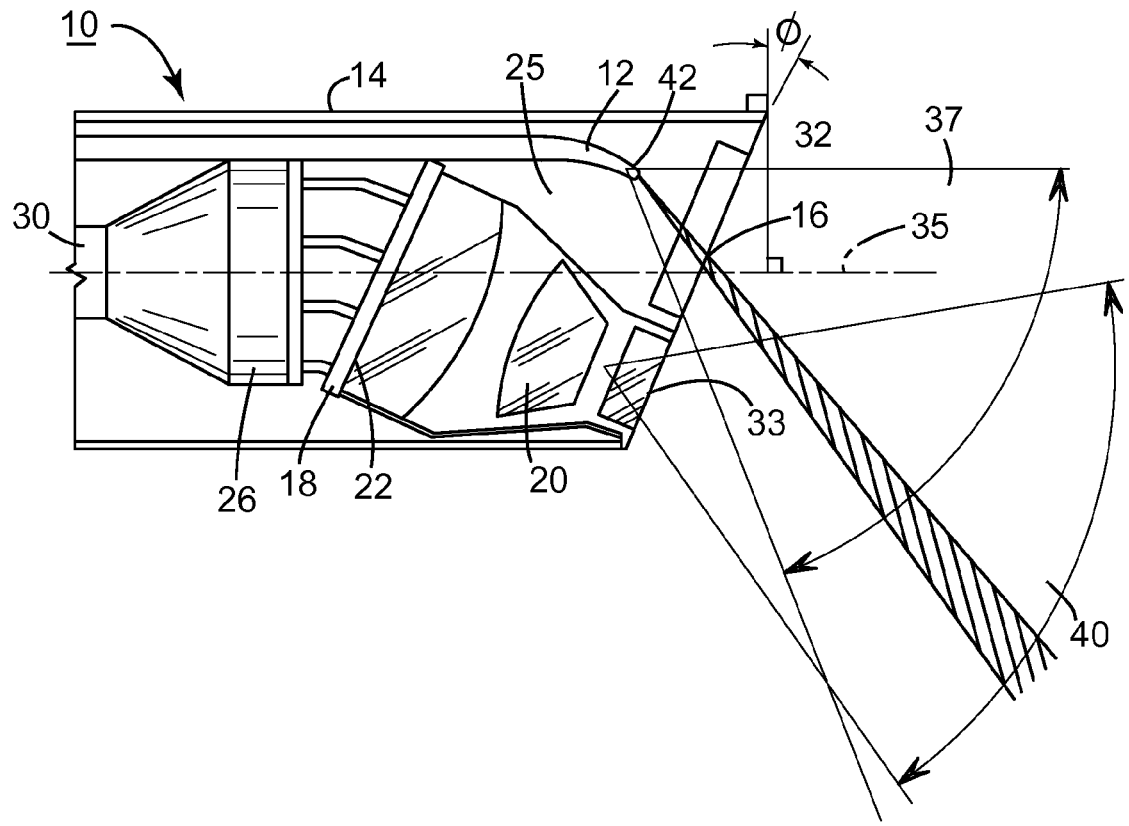
FIG. 1 is a sectional side elevation of a prior art shadow probe type borescope.
Figure 2:
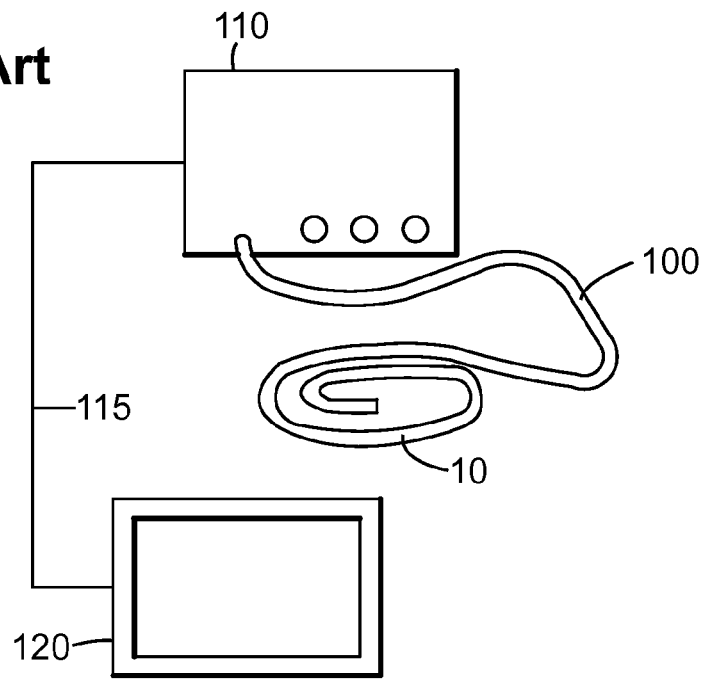
FIG. 2 is a schematic diagram of a borescope used with embodiments of the invention.

Referring now to the drawings in which like reference numerals are used to indicate the same or related elements, in FIG. 2 there is shown a general schematic of an embodiment of a borescope such as can be used with this invention. A general control box 110 containing a light source, external control mechanisms for use by the person handling the borescope, and internal control circuitry which is linked by electrical connection 115 to a monitor 120. The general control box also is linked to the borescope insertion tube 100 which ends in a borescope imager head 10. Other configurations are possible, such as a having a separate borescope handle containing some or all of the external and/or internal controls. Further, the borescope may include a processor or other device separate from or as part of the internal control circuitry which is used to identify points on a displayed image on monitor 120 and make calculations in connection with the displayed image.

Figure 3:
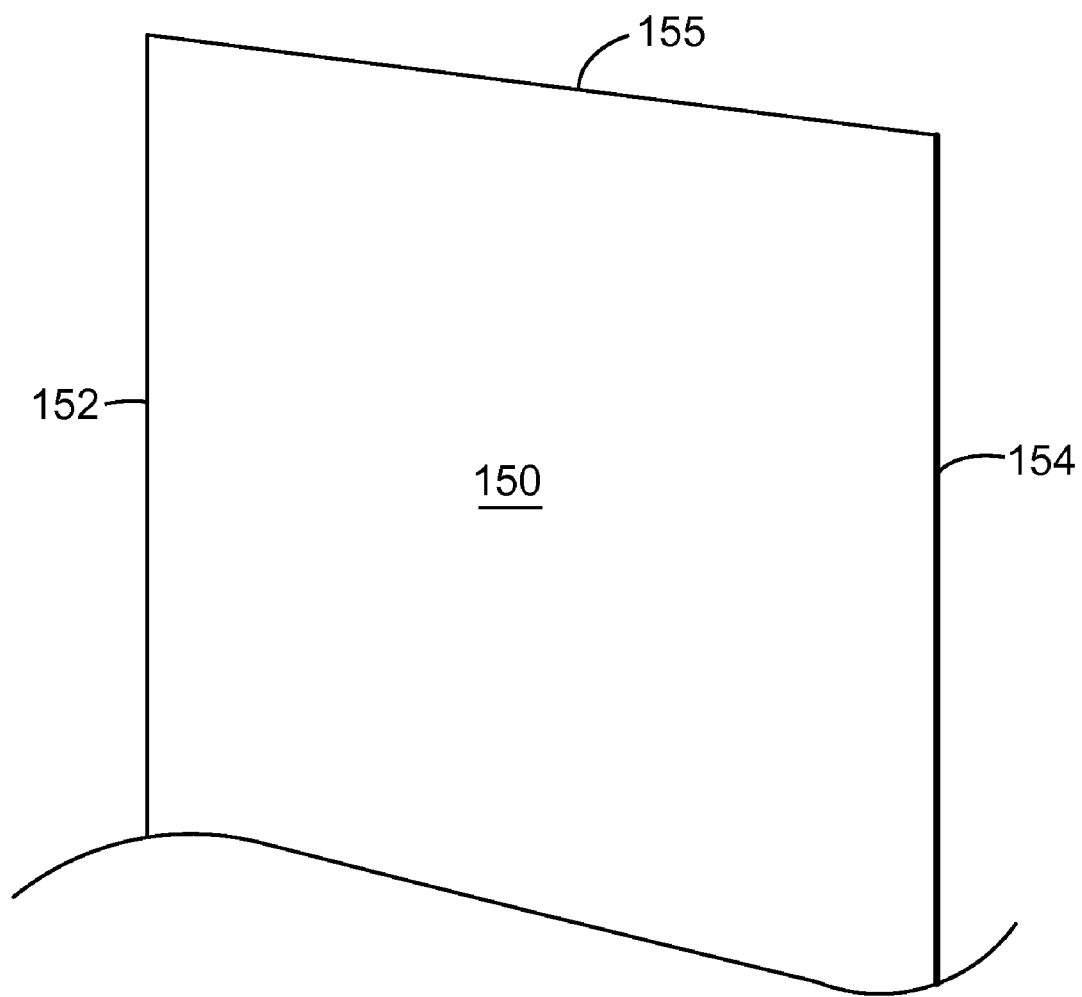
FIG. 3 is a front elevation view illustrating an intact turbine blade end.

FIG. 3 illustrates a common object for inspection with a borescope such as that described in FIG. 2—a blade 150 having blade tip 155. Blades 150 are found in devices such as aircraft engines and power generation turbines as part of turbo fans, turbo jet fans, compressors and turbines, among other uses. Such blades 150 are usually subject to harsh operating conditions and require inspection to protect against failures which may cause severe harm. A source of defects in blades 150 is at the blade tip 155, where portions are often worn or broken off of the blade tip 155. It is important during inspections to determine the size of the defect, so that an accurate determination whether to spend significant time and effort to repair the blade 150 is warranted. Often, maintenance specifications require measurement of the length or depth of a missing portion from the original blade tip or edge, respectively.

Figure 4:
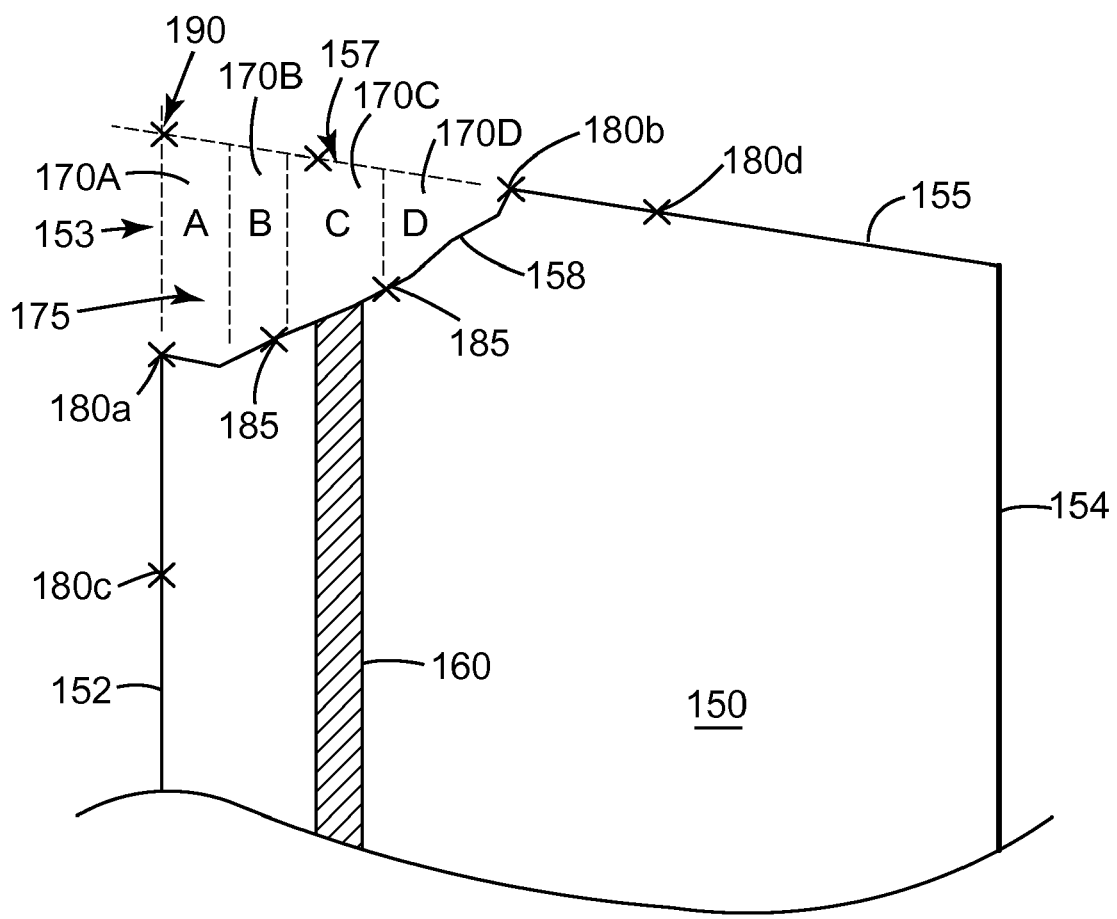
FIG. 4 is a is a front elevation view diagramming a measurement for determining the dimensions of a missing corner of the turbine blade of FIG. 3 in accordance with an embodiment of the invention.

A blade 150 with a missing portion 175 of the blade tip 155 is shown in FIG. 4 with various indicia used in one embodiment to determine the dimensions and area of the missing portion 175. First, a shadow 160 generated by the borescope is aligned with the blade 150 so that the area of the missing portion 175 is in the view and shadow 160 appears vertical in the displayed image and falls in the region of the missing portion 175. Aligning the shadow 160 in this manner indicates the probe is substantially perpendicular to the blade 150 under inspection which is a requirement for accurate results as the entire field of view is assumed to be at the same object distance as is indicated by the horizontal position of the shadow.

Once the probe is aligned, a user, such as a probe operator, defines the original side edge 152 and blade tip 155, respectively, on an image of the blade 150 using cursor markers 180a-d in at least two points on each edge 152, 155. One cursor marker 180a, 180b on each edge 152, 155 is positioned at the point on the edge 152, 155 where the missing portion 175 begins. These first cursor markers 180a, 180b define a starting measurement point for determining the length of the corresponding missing edge 153 and 157. The borescope apparatus includes a processor or other device which generates and positions the cursor markers 180a-d within the image frame responsively to user input. In the event, for example, that the missing portion 175 was located on the other corner of blade tip 155, then cursor markers 180a-d would be placed on blade tip 155 and original side edge 154.

The cursor markers 180a-d define lines 153, 157 corresponding to the boundary of the original blade 150 when the missing section 175 was intact. The lines 153, 157 intersect at intersection 190, which defines the extent, or bounds, of the missing portion 175. The borescope apparatus can then be used to calculate the length of the missing portion sides between points 180a and 190, and between points 180b and 190 using the X-Y position of the points 180a, b, 190. That is, the length of the missing portion along edge 152 from intersection 190 and depth of the missing portion along blade tip 155 from intersection 190 can be obtained using the cursor markers 180a-d and intersection point 190. The length and depth dimensions can then be compared, for example, with maintenance standards to determine whether repairs or replacement of the blade 150 with missing portion 175 are required, suggested, or not necessary. Further measurements based upon knowledge of the position of the cursor markers 180a-d and extrapolation of intersection 190 are also possible. Cursor markers 180a-d thus provide a basis for a processor or other computing device in or connected to the borescope to generate measurements for features of the object under inspection, including the dimensions of the missing portion 175, for display to a user via monitor 120 or other output device.

In a further embodiment of the method, after the cursor markers 180a-d are placed, the remaining edge 158 is defined using additional cursor markers 185 at several points along the edge 158. The cursor markers 185 on the remaining edge 158 are used to define the remaining edge 158 contour. The remaining edge contour and boundary 153, 157 of the original blade 150 then define the missing portion 175 area. In one method for determining the missing portion area, the missing portion 175 is subdivided into geometrically shaped sub-areas 170A, 170B, 170C, 170D which have their areas more readily calculated by the borescope apparatus. The calculations of the several areas 170A, 170B, 170C, 170D are then summed to get the total area of missing portion 175. It should be noted that the actual area of missing portion 157 can be obtained using either the shadow 160 as a guide to the dimensions of the missing portion area, or other dimensioning techniques known for use with other types of borescopes.

Figure 5:
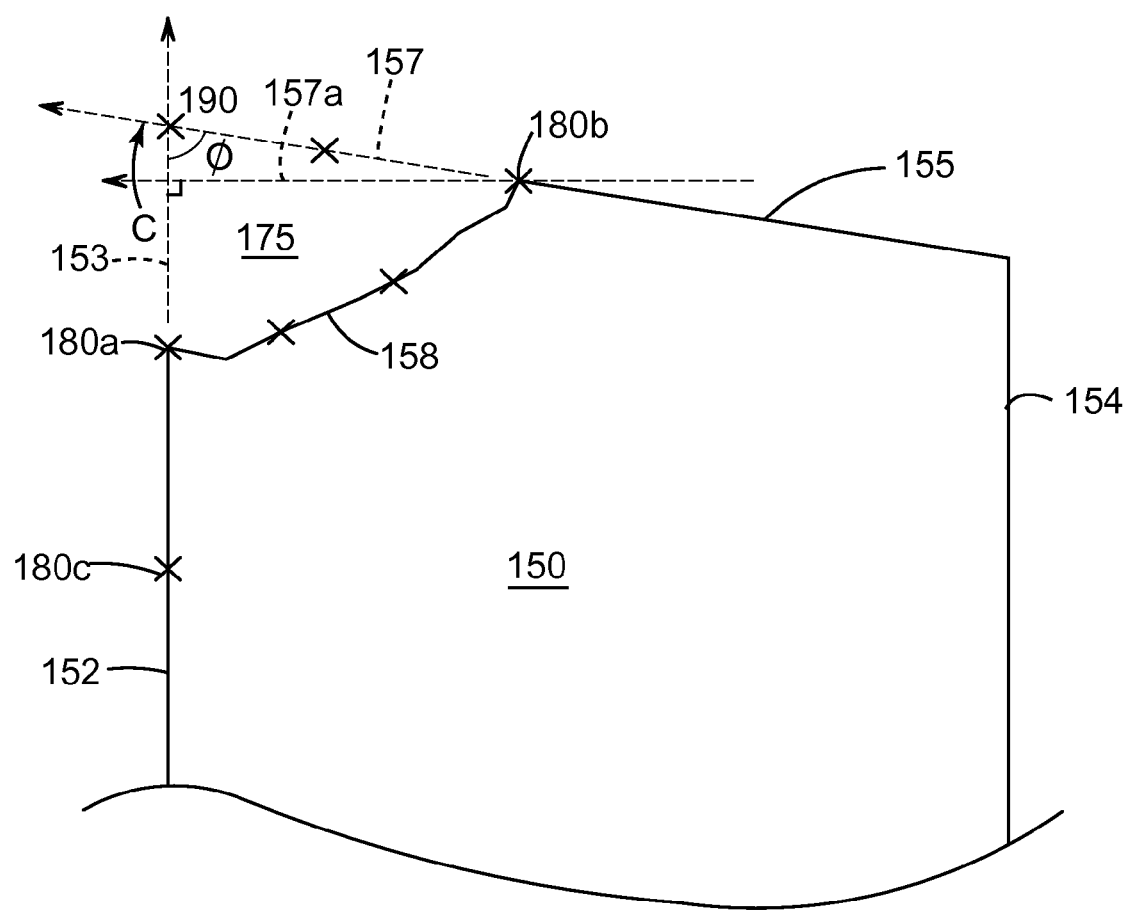
FIG. 5 is a front elevation view diagramming a measurement in accordance with a further embodiment of the invention.

In a further embodiment of the invention illustrated in FIG. 5, only three cursor markers 180a, 180b and 180c are required to initially identify the bounds of the missing portion 175. Cursor markers 180a and 180b are placed at the points where the respective remaining edges 152, 155 end and the mission portion 175 begins. Cursor marker 180c is placed at a different point along one of the two remaining edges 152, 155; in this case, cursor marker 180c is placed on side edge 152. Line 153 is then extrapolated from cursor markers 180a and 180c. Line 157a is initially extrapolated from cursor marker 180b by extending a line from cursor marker 180b to be perpendicular with line 153. However, the blade tip 155 is not accurately represented by the line 157a, as line 157a does not align with blade tip 155.

The borescope apparatus generates video overlays for a user such as a borescope operator to show the cursor markers 180a-c and lines 153, 157 relative to blade 150. The user manipulates the angle of line 157 pivoting about cursor marker 180b using the borescope controls until the angle of intersection Θ with line 153 is such that line 157 is aligned with blade tip 155 and accurately represents the former boundary of the blade tip 155 in the mission portion 175. Thus, one line 153 of the bounds for missing portion 175 is established automatically by the placement of cursor markers 180a, 180c, while the second line 157 is manually oriented until the mission portion 175 bounds are correctly defined. Measurements as described above can then be taken using the known positions of the cursor markers 180a-c and extrapolated position of intersection 190.

In an alternate embodiment, only first cursor markers 180a and 180b are placed at the point where each remaining edge 152, 155, 154 ends and missing portion 175 begins. The borescope apparatus then generates lines 153, 157 from first cursor markers 180a, 108b, respectively. Preferably, the lines 153, 157 are generated to at least intersect initially. The lines 153, 157 are then manipulated until the lines 153, 157 correctly define the bounds of the missing portion 175, such as by a user manually aligning each line 153, 157 with the corresponding one of the remaining edges 152, 155, 154 either independently or simultaneously by adjusting the position of the line intersection. Then, as above, the intersection point 190 of the lines 153, 157 and first cursor markers 180a, 180b are used to determine the dimensions.

Figure 6:
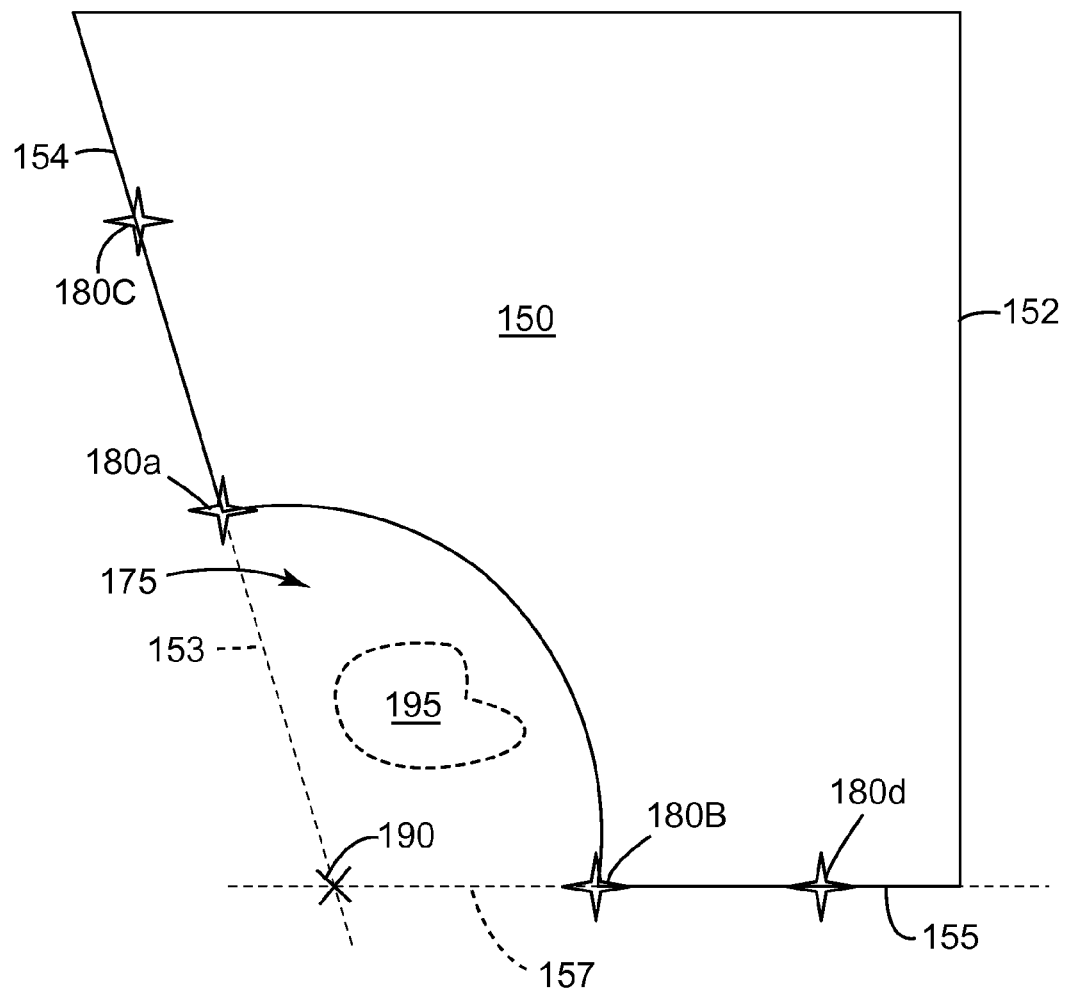
FIG. 6 is a front elevation view of a non-planar blade diagramming a measurement in accordance with another embodiment of the invention.
Figure 7:
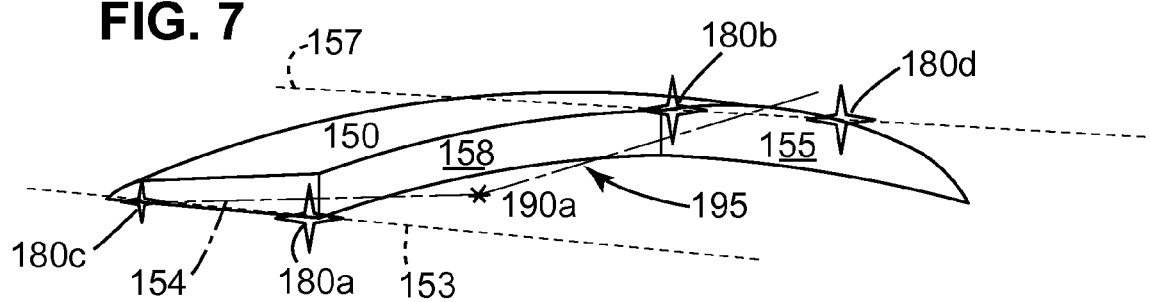
FIG. 7 is an end perspective view of the non-planar blade of FIG. 6.

FIGS. 6 and 7 illustrate a still further embodiment of the invention in which a blade 150 having a non-planar surface is presented for inspection and measurement of a mission portion 175 by a borescope. As best seen in FIG. 7, blade 150 is curved between edges 154 and 152, so that while viewed from the top as in FIG. 6, the blade 150 appears flat. As in the embodiments described above, four cursor markers 180a-d are placed along remaining edges 154, 155 As shown by FIG. 7, the projected lines 153 and 157 do not intersect in the same plane. When using technologies such as stereoscopic borescopes, which yield an x,y,z space coordinate for each cursor, this is almost always the case.

Borescopes using two-dimensional approaches, such as shadow-type borescopes, assume all cursor markers 180a-d are in the same plane determined by the shadow position. Thus, it is not necessary to determine z positions for each cursor, since the positions are all assumed to fall mathematically in the same plane. This assumption simplifies the calculations but may not give results that are as accurate as the 3-D methods yield. It will be appreciated, for example, that measurements taken from cursor markers 180a and 180b to intersection 190 as shown in FIG. 6, without any correction, will be erroneous due to the unrepresented angle resulting from the difference in height of the lines 153, 157 caused by the non-planar surface of the blade 150. Thus, the dimensions of the missing portion 175 cannot be measured to a high degree of accuracy using the methods above.

A three-dimensional solution, such as described above, is needed to both produce accurate measurements of the missing portion 175 bounds and address the mathematical issue of the points being non-planar. After cursor markers 180a-d are located on a borescope image, a reference plane 195 is determined from the three-dimensional positions of at least three (which would exactly define the reference plane), and preferably all four (using curve fitting techniques), of the cursor markers 180a-d. Then, translated edge lines representative of edges 154 and 155 and translated points representative of cursor markers 180a and 180b are defined on the reference plane. The translated edge lines and translated points may be defined through various mapping techniques. One possible technique can be done by first identifying lines which pass through cursor markers 180a, 180b, 180c, and 180d and are perpendicular to the reference plane, then defining the translated points as the intersection between the lines and the reference plane. The translated edge lines are subsequently defined as the lines passing through the translated points on the reference plane 195.

Once the translated edge lines and translated points are defined on the reference plane, the original position of the tip of the missing corner portion 175 can be estimated as the point 190a at which the translated edge lines intersect on the reference plane 195. Dimensions of the missing portion 175 can then be determined using the translated points and point 190a.

Alternatively, a plane which passes through cursor markers 180a and 180c for each pair of cursor markers 180a, c; 180b, d defining an edge 154, 155 of the blade 150 and is perpendicular to the reference plane 195 is determined. The point defined by the intersection of all three planes is the intersection 190a identifying the corner of the missing portion 175. Once the missing corner intersection 190a is identified, measurements are taken in three dimensions from the remaining edge cursor markers 180a, b, so that the measured dimensions of the missing portion 175 bounds are reasonably accurate despite the non-planar surface of the blade 150.

Figure 8:
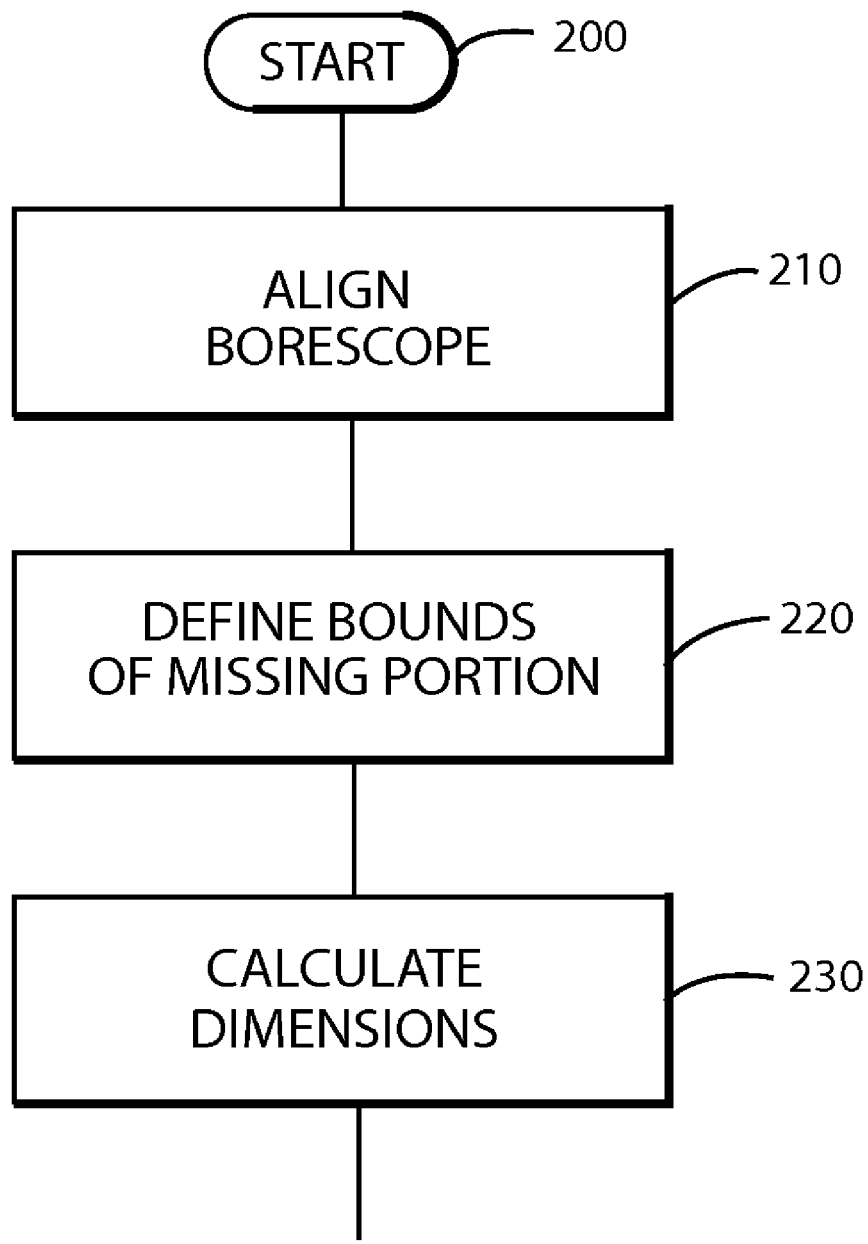
FIG. 8 is a flowchart illustrating an embodiment of the process for determining the area of a missing portion of the object under inspection.

FIG. 8 provides a general process flowchart of the method according to the embodiments described above. The process begins 200 when an object under inspection is identified with a borescope. The borescope is aligned 210 with respect to the object under inspection, such as by using a shadow 160 generated with the borescope or other known techniques for positioning the borescope substantially perpendicular to the object under inspection. Once the borescope is aligned 210, the remaining edges of the object under inspection are identified with cursor markers 180*a-d*, including the points immediately adjacent the missing portion on the remaining edges 152, 154, 155, and the missing portion 175 is defined 220 as described in the embodiments above. The missing portion dimensions can then be determined 230 based upon the two- or three-dimensional position of the cursor markers 180*a-d* defining the missing portion area, as described above. The dimensions of the missing portion 175 are then produced 240 for display and the process is complete.

In an embodiment wherein the borescope is aligned 210, for example, using three-dimensional position of at least three points and a best-fit plane, the missing portion 175 dimensions are calculated with respect to the best-fit plane. In a still further embodiment, the contour of the original and remaining edges 158 can be determined automatically without identifying points with cursor markers 185, such as using pattern recognition, so that once the borescope is aligned, a measurement of the missing portion dimensions is obtained.

As will be appreciated, the several embodiments of the invention described herein are particularly advantageous since the borescope is quickly aligned with the object under inspection and so the area calculations are made in a known plane with a high degree of accuracy. Thus, a single inspection tool can be used to quickly and accurately obtain the area of a missing portion of an object under inspection, leading to reduced inspection times and more accurate determinations of when service or repair is required on the object under inspection.

While the present invention has been described with references to preferred embodiments, various changes or substitutions may be made on these embodiments by those ordinarily skilled in the art pertinent to the present invention without departing from the technical scope of the present invention.

The construction and arrangement of the borescope measurement apparatus and method, as described herein and shown in the appended figures, is illustrative only. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the embodiments of the invention as expressed in the appended claims. Therefore, the technical scope of the present invention encompasses not only those embodiments described above, but all that fall within the scope of the appended claims.

What is claimed is:

1. A method for determining with a borescope the dimensions of a missing corner portion of an object under inspection, the object under inspection having a first and a second remaining edges adjacent the missing corner portion, the method comprising:
    aligning the borescope with the object under inspection for viewing a region containing the missing corner portion;
    capturing an image of the object under inspection including the missing corner portion;
    placing a first cursor markers on said image to identify a first points where the first remaining edges of the object under inspection ends and the missing corner portion begins;
    placing a second cursor marker on said image to identify a second point where the second remaining edge of the object under inspection ends and the missing corner portion begins;
    placing a third cursor marker on said image to identify a third point on the first remaining edges;
    defining a first missing portion boundary with said first cursor markers and said third cursor markers;
    extrapolating a second missing portion boundary from said second cursor marker to an intersection with said first missing portion boundary; and
    determining the missing portion dimensions using said first and second missing portion boundaries.

2. The method according to claim 1, wherein aligning the borescope comprises projecting a pattern on the object under inspection, and determining a magnification parameter based upon the position of the projected pattern in the image, wherein the magnification parameter is used in determining the dimensions of the missing corner portion.

3. The method according to claim 1, wherein aligning the borescope comprises positioning the borescope substantially perpendicular to a surface of the object under inspection.

4. A method for determining with a borescope the dimensions of a missing corner portion of an object under inspection, the object under inspection having a first and a second remaining edge adjacent the missing corner portion, the method comprising:
    aligning the borescope with the object under inspection for viewing a region containing the missing corner portion;
    capturing an image of the object under inspection including the missing corner portion;
    placing a first cursor marker on said image to identify a first point where the first remaining edge of the object under inspection ends and the missing corner portion begins;
    placing a second cursor marker on said image to identify a second point where the second remaining edge of the object under inspection ends and the missing corner portion begins;
    placing a third cursor marker on said image to identify a third point on the first remaining edge;
    generating a first line defined by said first cursor marker and said third cursor marker, said first line defining a first missing portion boundary associated with the first remaining edge;
    generating a second line perpendicular to said first line, extending from said second cursor marker;
    adjusting said second line until said second line defines a second missing portion boundary associated with the second remaining edge;
    determining a position of an intersection of said first and said second lines; and
    determining the missing portion dimensions using said first and said second missing portion boundaries.

5. The method according to claim 1, further comprising placing a fourth cursor marker on said image to identify a fourth point on the second remaining edge; and
wherein defining a missing portion boundary comprises:
- defining a best-fit reference plane using said first, second, third, and fourth cursor markers;
- determining the position of an intersection point on the best-fit plane corresponding to the missing tip of the missing corner portion; and
- defining the missing corner portion boundary using the first cursor marker positions and said intersection point.

6. A method for determining with a borescope the dimensions of a missing corner portion of a blade, the blade having a first and a second remaining edges adjacent the missing portion, the method comprising:
- aligning the borescope with the blade;
- capturing an image of the blade including the missing corner portion using the borescope;
- placing a first cursor markers on said image to identify a first points where the first remaining edges of the blade ends and the missing portion begins;
- placing a second cursor marker on said image to identify a second point where the second remaining edge of the blade ends and the missing portion begins;
- placing a third cursor marker on said image to identify a third point on the first remaining edges,
- defining a first missing portion boundary using the first cursor markers and said third cursor markers;
- extrapolating a second missing portion boundary from said second cursor marker to an intersection with said first missing portion boundary; and
- calculating a length and depth of the missing corner portion using said first and said second missing portion boundaries.

7. The method according to claim 6, wherein aligning the borescope comprises projecting a pattern on the blade, and determining a magnification parameter based upon the position of the projected pattern in the image, wherein the magnification parameter is used in determining the dimensions of the missing corner portion.

8. The method according to claim 6, wherein aligning the borescope comprises positioning the borescope substantially perpendicular to a surface of the blade.

9. The method according to claim 6, wherein calculating a length and depth of the missing portion further comprises calculating the missing portion area defined by the missing portion boundary by subdividing the missing portion into geometric shapes, calculating the areas of the geometric shapes and summing the areas of the geometric shapes.

10. The method according to claim 6, further comprising:
- defining a best-fit plane using said first, said second, and said third cursor markers;
- calculating a first plane perpendicular to said best-fit plane and containing said first and said third cursor markers;
- calculating a second plane perpendicular to said best-fit plane and containing said second cursor marker;
- determining an intersection point of said best-fit plane, said first plane and said second plane; and
- defining said missing portion boundary using said first cursor marker and said intersection point.

11. The method according to claim 6, wherein the blade is a part of a turbo fan, turbo jet fan, compressor or turbine.

12. A method for determining with a borescope the dimensions of a missing corner portion of a blade, the blade having a first and a second remaining edge adjacent the missing portion, the method comprising:
- aligning the borescope with the blade;
- capturing an image of the blade including the missing corner portion using the borescope;
- placing a first cursor marker on said image to identify a first point where the first remaining edge of the blade ends and the missing portion begins;
- placing a second cursor marker on said image to identify a second point where the second remaining edge of the blade ends and the missing portion begins;
- placing a third cursor marker on said image to identify a third point on the first remaining edge
- generating a first line defined by said first cursor marker and said third cursor marker said first line defining a first missing portion boundary;
- generating a second line perpendicular to the first line extending from said second cursor marker;
- adjusting the second line until the second line defines a missing edge of said second remaining edge, said adjusted line defining a second missing portion boundary;
- generating an intersection of said first and second lines; and
- calculating a length and depth of the missing corner portion using said first and said second missing portion boundaries.

* * * * *

UNITED STATES PATENT AND TRADEMARK OFFICE
CERTIFICATE OF CORRECTION

| | | |
|---|---|---|
| PATENT NO. | : 7,782,453 B2 | |
| APPLICATION NO. | : 11/617340 | |
| DATED | : August 24, 2010 | |
| INVENTOR(S) | : Bendall et al. | |

It is certified that error appears in the above-identified patent and that said Letters Patent is hereby corrected as shown below:

In Column 1, Line 45, delete "boresope" and insert -- borescope --, therefor.

In Column 8, Line 5, in Claim 1, delete "edges" and insert -- edge --, therefor.

In Column 8, Line 11, in Claim 1, delete "markers" and insert -- marker --, therefor.

In Column 8, Line 12, in Claim 1, delete "points" and insert -- point --, therefor.

In Column 8, Line 12, in Claim 1, delete "edges" and insert -- edge --, therefor.

In Column 8, Line 20, in Claim 1, delete "edges;" and insert -- edge; --, therefor.

In Column 8, Line 22, in Claim 1, delete "markers" and insert -- marker --, therefor.

In Column 8, Line 22, in Claim 1, delete "markers;" and insert -- marker; --, therefor.

In Column 9, Line 19, in Claim 6, delete "markers" and insert -- marker --, therefor.

In Column 9, Line 20, in Claim 6, delete "points" and insert -- point --, therefor.

In Column 9, Line 20, in Claim 6, delete "edges" and insert -- edge --, therefor.

In Column 9, Line 26, in Claim 6, delete "edges," and insert -- edge; --, therefor.

In Column 9, Line 28, in Claim 6, delete "markers" and insert -- marker --, therefor.

In Column 9, Line 28, in Claim 6, delete "markers;" and insert -- marker; --, therefor.

In Column 10, Line 31, in Claim 12, delete "edge" and insert -- edge; --, therefor.

Signed and Sealed this
Eighth Day of February, 2011

David J. Kappos
*Director of the United States Patent and Trademark Office*

CERTIFICATE OF CORRECTION (continued)
U.S. Pat. No. 7,782,453 B2

In Column 10, Line 39, in Claim 12, delete "line" and insert -- second line --, therefor.